(12) United States Patent
Fahringer et al.

(10) Patent No.: US 6,457,312 B2
(45) Date of Patent: Oct. 1, 2002

(54) INTERNAL COMBUSTION ENGINE

(75) Inventors: Albert Fahringer, Kössen; Bernd Lutz, Pflach; Peter Skorjanz, Paudorf, all of (AT)

(73) Assignee: Jenbacher Aktiengesellschaft, Jenbach (AT)

( * ) Notice: Subject to any disclaimer, the term of this patent is extended or adjusted under 35 U.S.C. 154(b) by 0 days.

(21) Appl. No.: 09/900,665

(22) Filed: Jul. 6, 2001

(30) Foreign Application Priority Data

Jul. 7, 2000 (AT) .......................................... 1163/2000

(51) Int. Cl.⁷ ................................................ F02B 33/44
(52) U.S. Cl. ............................. 60/611; 60/600; 60/602; 123/564
(58) Field of Search ........................... 60/602, 603, 611, 60/600, 601; 123/564, FOR 120

(56) References Cited

U.S. PATENT DOCUMENTS

| | | | | |
|---|---|---|---|---|
| 3,568,435 A | * | 3/1971 | May .......................... | 60/611 |
| 4,394,812 A | * | 7/1983 | Mezger ....................... | 60/600 |
| 4,691,521 A | | 9/1987 | Hirabayashi et al. ......... | 60/602 |
| 4,793,140 A | * | 12/1988 | Esch ............................ | 60/600 |
| 4,873,961 A | * | 10/1989 | Tanaka ....................... | 123/564 |
| 5,526,645 A | | 6/1996 | Kaiser ......................... | 60/602 |
| 5,680,763 A | * | 10/1997 | Unland et al. ............... | 60/602 |
| 5,694,899 A | * | 12/1997 | Chvatal et al. ............... | 60/611 |
| 6,058,706 A | * | 5/2000 | Aschner et al. .............. | 60/600 |

FOREIGN PATENT DOCUMENTS

| | | | | |
|---|---|---|---|---|
| DE | 2441804 | | 3/1976 | |
| EP | 0 064 794 A2 | * | 11/1982 | ............... 60/605.1 |
| JP | 63108662 | | 4/1988 | |
| JP | 404134130 A | * | 5/1992 | ........ 123/FOR 120 |
| JP | 405018251 A | * | 1/1993 | |
| JP | 10089079 A | * | 4/1998 | |

* cited by examiner

*Primary Examiner*—Thomas Denion
*Assistant Examiner*—Thai-Ba Trieu
(74) *Attorney, Agent, or Firm*—Lorusso & Loud

(57) ABSTRACT

An internal combustion engine, in particular a stationary gas engine, comprising a compressor arranged in the induction tract, in particular an exhaust gas turbocharger, an electrically operable blow-off valve connected downstream of the compressor, and a pressure sensor for detecting the pressure actual value of the mixture in the region of the blow-off valve. In according with the invention there is provided a device (9) for detecting the engine power output (N), a device (10) for calculating a pressure reference value in dependence on the detected engine power output and a relationship previously stored in a memory between engine power output (N) and pressure reference value ($P_{soll}$), and a regulating device (11) for regulating the blow-off valve (7) until the pressure actual value ($P_{ist}$) reaches the calculated pressure reference value ($P_{soll}$).

5 Claims, 1 Drawing Sheet

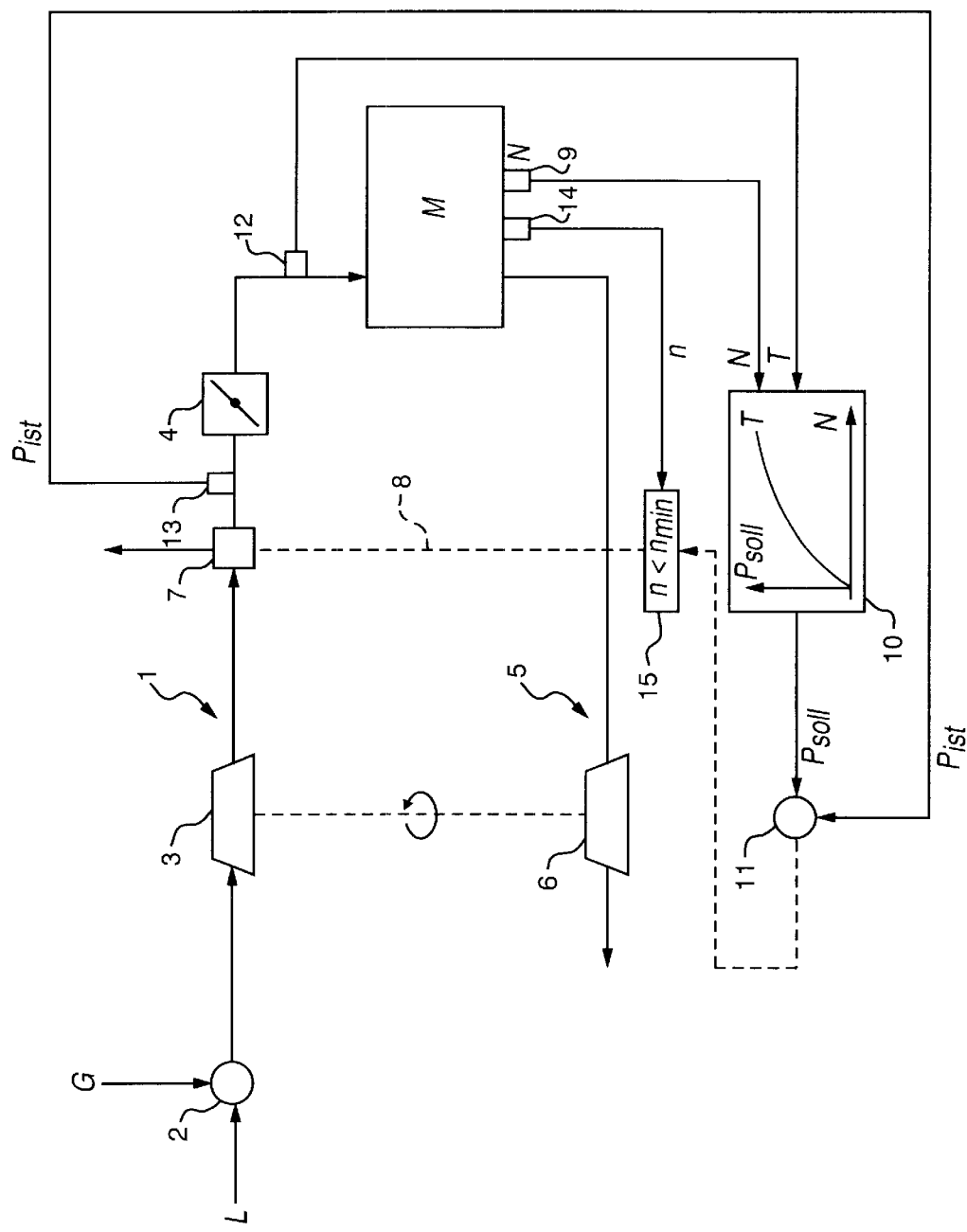

INTERNAL COMBUSTION ENGINE

BACKGROUND OF THE INVENTION

The invention concerns an internal combustion engine, in particular a stationary gas engine, comprising a compressor arranged in the induction tract, an electrically operable blow-off valve connected downstream of the compressor, and a pressure sensor for detecting the pressure actual value of the mixture in the region of the blow-off valve.

In order to improve the load shut-down characteristics in the case of engines, in particular gas engines, it is already known for a blow-off valve to be connected downstream of the compressor in order to be able to bring down the charging pressure in load removal situations without turbocharger pumping. Turbocharger pumping occurs whenever the compressor is 'throttled' at a working point with a great deal of throughput on the outlet side. That procedure—once started—is totally uncontrollable and generally results in 'total loss' of the charging pressure with subsequent stoppage of the engine. In order to prevent an excessive increase in the engine speed in the event of load shut-down however, 'throttling' must be effected. Therefore, by means of blowoff regulation, a valve downstream of the turbocharger is opened virtually at the same moment in time and that therefore affords the possibility of being able to reduce the throughput in a controlled fashion (in spite of closure of the throttle valve). U.S. Pat. No. 5,526,645 discloses an excess air control system for a dual-fuel or spark ignition gas internal combustion engine in which an air blow-off valve is coupled to an air bypass-line linking the air intake to a turbo charger and the air manifold in order to control the air manifold pressure dependence on different measured engine characterisation parameters. This concept cannot be used for improving the load shut down characteristics of an internal combustion engine of the kind set forth which is mainly controlled by a throttle valve, because blowing an air-gas-mixture around a turbo charger in a bypassline results in a negative impact on the air-gas-mixture and is therefore not practicable.

SUMMARY OF THE INVENTION

The object of the invention is to provide an internal combustion engine of the kind set forth in the opening part of this specification for reliable regulation for the blow-off valve, in particular for the avoidance of turbocharger pumping.

The internal combustion engine according to the invention is characterised by:
  a device for detecting the engine power output,
  a device for calculating a pressure reference value in dependence on the detected engine power output and a relationship previously stored in a memory between engine power output and pressure reference value, and
  a regulating device for regulating the blow-off valve until the pressure actual value reaches the calculated pressure reference value.

The invention is based on the notion that, at a given combustion gas-air ratio of the mixture (and at a given temperature) a predetermined relationship obtains between the engine power output and the pressure of the mixture in the induction tract. In accordance with the invention, that relationship is utilised to afford a pressure-controlled regulation effect for the blow-off valve The relationship between engine power output and the pressure reference value can be ascertained either empirically or from measurements. It can then be stored for example in the form of a formula with given parameters or in the form of a cross-reference table. At any event that arrangement is capable of achieving a pressure reference value from the actually measured engine power output and a correctively involved temperature value.

The blow-off valve is now regulated until the pressure actual value reaches the pressure reference value. In general, that pressure reference value above which the blow-off valve opens is set higher by a small amount (for example between 0.2 and 0.3 bar) than corresponds to the empirical and measured relationship between the values involved, in the case of an engine without blow-off valve. That therefore advantageously provides with the blow-off valve a safety margin in relation to the set pressure point, so that a normal engine regulation system which acts on the throttle valve still has an adequate effective range of influence. When the throttle valve is completely open therefore the engine speed still cannot be brought under control although a large part of the 'over-power' is removed by way of the blow-off valve The actual reduction in excessive speed of rotation then has to be effected by way of the above-mentioned throttle valve control system. It will be appreciated that the throttle valve does not now have to be closed very far because of the pressure which has been kept at a low level, in order to be able to reduce the engine power output under the given load.

If the pressure downstream of the compressor which is in particular an exhaust gas turbocharger falls below the reference value the blow-off valve is closed, which means that as much mass flow as possible again passes to the engine and also to the turbine. As a result, the engine power output and also the turbocharger speed can be held at a sufficiently high level so that the engine speed does not fall excessively.

For shutdown procedures in the range of low levels of power output, a minimum reference value is predetermined for the pressure so that the valve does not remain constantly open in an overspeed situation and when the pressure is already low. By virtue of the regulating procedure, no compressor pumping occurs with a sufficiently large blow-off valve cross-section and sufficiently rapid opening of the valve, as the blow-off valve holds the charging pressure at a low level in the ranges in which the throttle valve can close far by virtue of the overspeed and in which therefore there is a pumping risk.

Preferably therefore for that purpose there is further provided a device for detecting the speed of the engine, wherein a comparison device closes the blow-off valve independently of the signal from the regulating device when the speed is or falls below a predeterminable reference value. The regulating system according to the invention remains a pressure-controlled regulating system. The speed signal is used independently of that pressure-controlled regulation effect to close the blow-off valve when the speed falls below a reference value.

Further advantages and details of the invention will be described in greater detail with reference to the specific description hereinafter.

BRIEF DESCRIPTION OF THE DRAWING

The FIGURE shows an embodiment of an internal combustion engine according to the invention.

DETAILED DESCRIPTION OF THE INVENTION

The internal combustion engine M according to the invention, in particular a multi-cylinder gas engine, has in its induction tract 1 an air-gas mixer 2. The mixture is compressed by way of the turbocharger and passes by way of the throttle valve 4 to the inlet valves of the internal combustion engine M. A mixture cooler which is possibly provided is not shown here The turbine 6 of the turbocharger is arranged in the exhaust gas tract 5 of the engine M in per se known manner.

Disposed in the induction tract 1 of the internal combustion engine M is an electrically operable blow-off valve 7, the regulation of which is subject-matter of the present invention. The blow-off valve can be actuated by way of a control line 8 in respect of its degree of opening or closing.

In accordance with the invention there is now provided:

a device 9 for detecting the engine output power N, a device 10 for calculating a pressure reference value $P_{soll}$ in dependence on the detected engine power output N and a relationship, stored previously in the memory, between the engine power output N and the pressure reference value $P_{soll}$, and a regulating device 11 for regulating the blow-off valve 7 until the pressure actual value $P_{ist}$ (sensor 13) reaches the calculated pressure reference value.

The previously stored relationship between the engine power output and the pressure reference value is diagrammatically represented in the Figure by a characteristic curve That characteristic curve can be ascertained empirically or by measurements. It can be stored for example in the form of a formula together with stored parameters or in the form of a cross-reference table. As a correction value in relation to the relationship, it is also possible to take account of the mixture temperature T which is detected by way of a temperature sensor 12.

The illustrated device now operates as follows: the engine power output N which is detected at the present time and the mixture temperature T are fed to the device 10. The latter then ascertains from a predetermined relationship a reference value for the mixture pressure. By virtue of opening and closing of the blow-off valve 7 the regulating device 11 then regulates to that mixture pressure, in which case the pressure actual value is detected in the region of the blow-off valve 7 by the pressure sensor 13.

This therefore overall involves pressure-controlled regulation of the blow-off valve.

In accordance with a particular embodiment of the invention it is further provided that the speed of rotation n of the engine is detected by way of a device 14. A comparison device 15 detects that engine power output N and in any case closes the blow-off valve 7 if the actual speed falls below the predetermined reference speed $n_{min}$. That occurs even if the pressure-controlled regulation action by way of the regulating device 11 were to open the blow-off valve.

What is claimed is:

1. A stationary internal combustion gas engine, comprising a compressor arranged in the induction tract, an electrically operable blow-off valve connected downstream of the compressor, and a pressure sensor for detecting the pressure actual value of the mixture in the region of the blow-off valve, characterised by a device (9) for detecting the engine power output (N), a device (10) for calculating a pressure reference value in dependence on the detected engine power output and a relationship previously stored in a memory between engine power output (N) and pressure reference value ($P_{soll}$), and a regulating device (11) for regulating the blow-off valve (7) until the pressure actual value ($P_{ist}$) reaches the calculated pressure reference value ($P_{soll}$).

2. The internal combustion engine as set forth in claim 1 characterised in that there is further provided a temperature sensor (12) for detecting the mixture temperature (T) upstream of the inlet valves, wherein the device (10) for calculating the pressure reference value besides the engine power output (N) also takes account of the detected mixture temperature (T) in accordance with a previously stored relationship.

3. The internal combustion engine as set forth in claim 1 characterised in that the blow-off valve (7) is arranged between the compressor (3) and a throttle valve (4) in the induction tract (1).

4. The internal combustion engine as set forth in claim 1 characterised in that there is further provided a device (14) for detecting the speed of rotation (n) of the engine (M), wherein a comparison device (15) closes the blow-off valve (7) independently of the signal from the regulating device (11) if the speed of rotation (n) is or falls below a predetermined reference value ($n_{min}$).

5. The internal combustion engine as set forth in claim 1 characterised in that the compressor is an exhaust gas turbocharger.

* * * * *